June 13, 1967 M. A. BRAHLER ETAL 3,324,634
VAPOR-LIQUID SEPARATOR

Filed May 5, 1965 3 Sheets-Sheet 1

INVENTORS
Marvin A. Brahler
Lowell E. Johnson
Thomas M. Modrak
BY
ATTORNEY

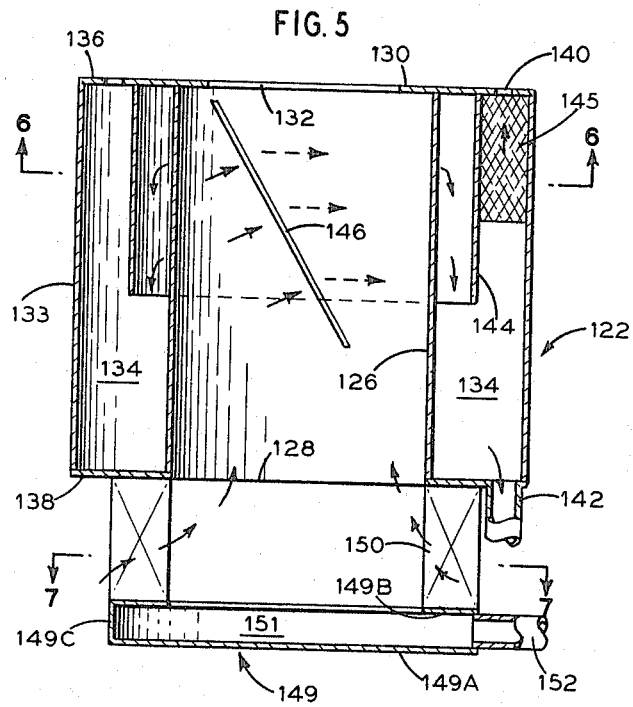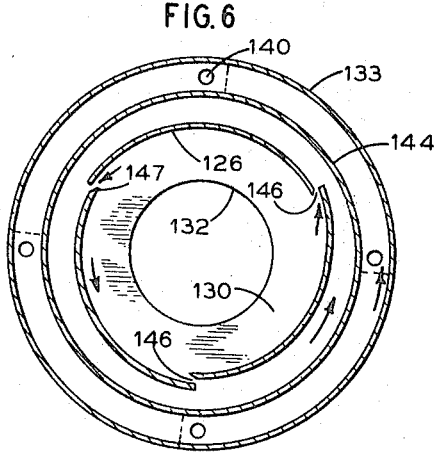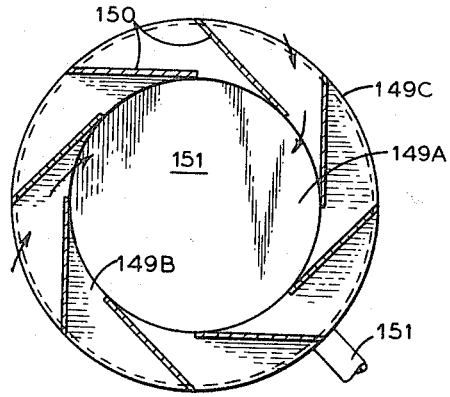

3,324,634
VAPOR-LIQUID SEPARATOR

Marvin A. Brahler, Louisville, Lowell E. Johnson, Alliance, and Thomas M. Modrak, Beloit, Ohio, assignors to The Babcock & Wilcox Company, New York, N.Y., a corporation of New Jersey
Filed May 5, 1965, Ser. No. 453,339
4 Claims. (Cl. 55—337)

This invention relates in general to vapor-liquid separators and more particularly to such equipment utilized as secondary separation means in combination with known primary vapor-liquid separators.

Depending primarily on the required performance of the vapor-liquid separation equipment several stages of separation may be necessary in order to assure that the final vapor product is in a satisfactory dry state. In the past centrifugal or whirl chamber type separators have usually been employed for the first stage, with corrugated scrubbers being used for the second stage to remove any entrained liquid from the vapor exhausted from the primary separator. Patent No. 2,862,479 dated Dec. 2, 1958, issued to Robert U. Blazer et al. shows a two stage separator of this general type. A problem, particularly in high capacity units such as shown in Blazer et al. is the amount of space required for the scrubber, this space often being much greater than that required for the steam generating equipment due to critical velocity limitations of the steam passing through the scrubber element. In view of the size of many present day units the space required for corrugated scrubbers has exceeded the allowable dimensions for the shipment of assembled units by usual means. Further, apart from the problem of shipment the size of the unit also makes it more costly to construct and provides special fabrication problems especially where field erection is involved.

Accordingly, it is the primary object of the invention to afford a means for secondary vapor-liquid separation without increasing the size of the unit over that normally required for primary centrifugal separators.

Additionally, it is an object of the invention to afford a secondary separator of the centrifugal or whirl chamber type. Another object of the invention is to provide a vapor bypass arrangement within the secondary separator for assuring that the separated liquid does not become reentrained in the separated vapor.

Therefore, the present invention provides a separator which may be used for secondary vapor-liquid separation comprising a cylindrical cyclone vapor-liquid separator or can having a vapor-liquid mixture inlet in its lower end and a separated vapor outlet from its upper end. Vanes are disposed at the inlet to the can to impart a whirling flow path to the mixture. Concentrically encircling the can are walls which combine with it to provide a closed annular flow space. A plurality of narrow elongated openings are located in the can wall for skimming separated liquid off its inner surface and directing the liquid into the flow space. Depending from the upper end of the flow space is a baffle for directing separated liquid in a downward path within the space. Vapor outlets are provided from the top of the annular flow space and a liquid outlet is situated in its lower end.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

FIG. 5 is a vertical cross section of another embodiment of the secondary separator shown in FIG. 2;

FIG. 6 is a transverse section taken along line 6—6 in FIG. 5, and

FIG. 7 is a transverse section taken along line 7—7 in FIG. 5.

Figure 1:
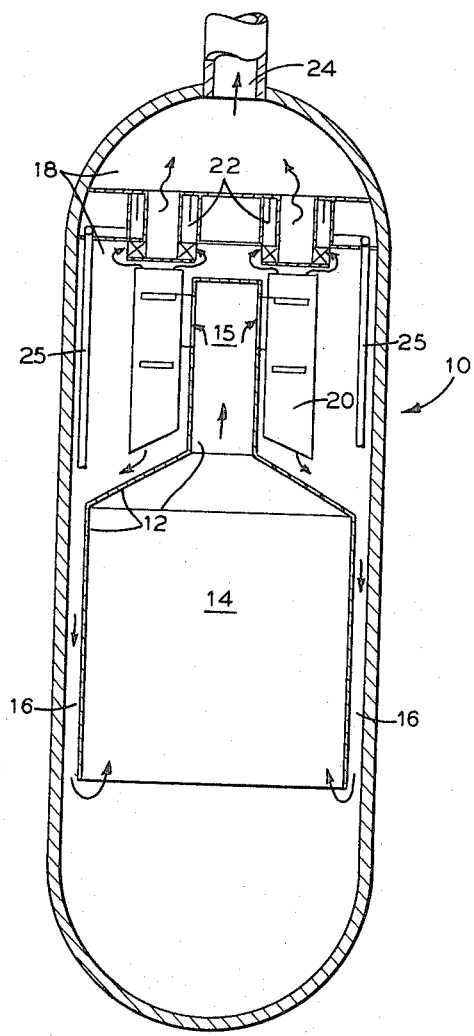
FIG. 1 is a partly schematic vertical section through a heat exchanger incorporating an arrangement of a primary and secondary separator.

In FIG. 1 there is shown a heat exchanger 10 divided by the walls 12 into a vapor generating space 14, a vapor-liquid collection space 15, a downcomer space 16 and a separating space 18. In the separating space 18 there is a plurality of primary separators 20 of the type disclosed in U.S. 2,923,377 and secondary separators 22 and at its upper end there is a dry vapor outlet 24. Separated liquid conduits 25 communicate between the secondary separators 22 and the downcomer space 16. Though not illustrated in FIG. 1 vapor generating tubes would be located in the space 14 for indirect heat transfer from a heating fluid to a fluid to be vaporized.

Figure 2:
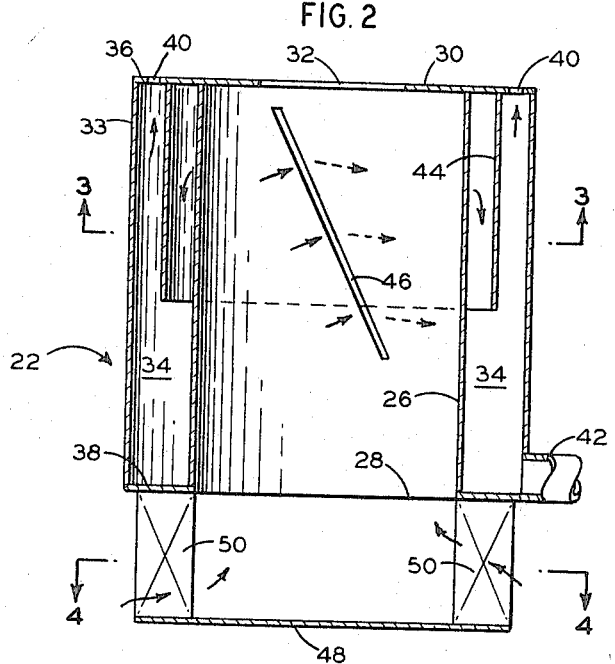
FIG. 2 is an enlarged vertical cross section showing the secondary separator illustrated in FIG. 1.

In FIG. 2 there is illustrated in detail the secondary separator 22 shown in FIG. 1. The separator 22 comprises a vertically arranged cylindrically shaped separator can 26 open at its lower end to provide a vapor-liquid inlet 28. Across the top of the can is positioned a horizontally arranged annular shaped plate 30 affording a centrally located separator vapor outlet 32.

Laterally surrounding the separator can 26 is a concentrically arranged cylindrically shaped wall section 33 which is spaced from the can 26 forming therebetween an annular flow space 34. The upper end of the space 34 is closed by a horizontally disposed plate section 36 which is a portion of and extends radially outward from the plate 30. Another similarly shaped plate section 38 extends from the can 26 to the wall section 33 providing a closure across the lower end of the flow space 34. A number of vapor outlets 40 for venting flow space 34 are located at spaced locations in the plate sections 36 and a liquid outlet 42 is situated at the lower end of the flow space. An upright, cylindrically shaped baffle 44 extends downwardly from the plate section 36 within the flow space 34. The baffle is spaced intermediate the can 26 and the vapor outlets 40 from the flow space 34.

Figure 3:
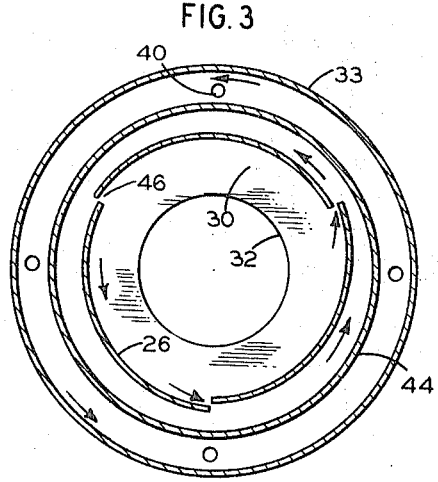
FIG. 3 is a transverse section taken along line 3—3 in FIG. 2.

Three spaced narrow elongated slots 46 are provided in the wall of the can 26 to afford communication from within the separator to the annular flow space 34. As shown in FIG. 3 the walls of the can are flared inwardly along one edge of the slot 46 and outwardly along the opposite edge of the slot. The slots are disposed at an angle of approximately 30° to the vertical extending over about two-thirds the height of the can.

At a spaced interval below the can and in alignment with its inlet 28 is a plate 48. Extending between the plate and the plate section 38 are a plurality of vertically arranged vanes 50 disposed tangentially to the wall of the separator can 26, see FIG. 4.

In FIG. 5 there is shown another secondary separator 122 which is an alternate embodiment of the unit shown in FIG. 2. Separator 122 is generally similar in construction to separator 22 having a can 126 with a vapor-liquid inlet 128 at its lower end and a vapor outlet 132 formed by plate 130 at its upper end. Wall 133 concentrically encircles the can and forms an annular flow space 134 closed at its upper and lower ends respectively by plate sections 136 and 138. The flow space 134 has a plurality of vapor outlets 140 at its upper end. Within the flow space 134 a baffle 144 extends downwardly from the plate section 136. In the space between the baffle 144 and the wall 133 demisters 145 are located to assure that the vapor is dry when it leaves the flow space 134.

The can 126 has three narrow elongated slots 146 similar to those shown in separator can 26. However, the inwardly displaced edge of the slots 146 is provided with a knife edge 147.

Below the separator can 126 is a plate assembly 149 comprising a lower plate 149A, an upper ring shaped plate 149B and a vertically arranged circular closure plate 149C connecting plate 149A and plate 149B. A plurality of vanes 150 extend vertically from the annular plate section 149B to the plate section 138 and as in FIG. 2 these vanes are arranged tangentially to the wall of can 126, see FIG. 7. The wall assembly 149 forms a liquid collection space 151 below the separator can and is provided with a separated liquid outlet 152.

In the heat exchanger 10 illustrated in FIG. 1 the arrows show the flow path of the fluid to be vaporized. During operation the fluid including the makeup passes downwardly through the downcomer space 16 and reversing direction enters the vapor generating space 14 where it is heated and transformed into a vapor-liquid mixture as it passes upwardly entering the collection space 15 and then flowing into the primary separators 20. Separated liquid flows downwardly from the bottom of the separators and into the downcomer space 16 and separated vapor and entrained liquid flows upwardly and upon leaving the top of the separators 20 passes into the secondary separators 22.

Referring now to FIG. 2, arrows indicate the path of the upwardly flowing vapor and its entrained liquid as it enters the secondary separators 22, passing between the vanes 50, which because of their tangential arrangement relative to the wall of the separator can 26 impart a whirling motion to the vapor-liquid mixture. The centrifugal forces set up by the whirling motion drive the heavier liquid component outwardly forming a film on the wall of the can while the lighter vapor component flows upwardly through its center exiting through outlet 32. Because of the drag due to the differential in the velocity of the separated vapor and liquid components the upwardly flowing vapor causes the film of liquid on the inner wall to be pulled upwardly.

To prevent any reentrainment of the separated liquid into the separated vapor at the upper end of the can the film of liquid is skimmed off the wall at the surface discontinuities formed by the slots 46 and flows into the annular flow space 34. Due to the pressure differential which exists between the interior of the can 26 and the flow space 34, a relatively small controlled amount of steam is also drawn through the slots 46 into the flow space. The slots 46 are purposely inclined as shown so the liquid and vapor will continue to flow in a circular path within the flow space 34. The baffle 44 forces the separated portion to flow downwardly to its lower end where within the lower section of flow space 34 due to gravity the vapor and liquid separate. The vapor flows upwardly and out through outlets 40, while the liquid continues its downward path passing out through the outlets 42 and is returned, as by conduits 25 in FIG. 1, to the main body of the liquid for recirculation within the exchanger 10. As shown in FIG. 5 demisters may be used to assist the gravity separation of the vapor and liquid and assure that dry vapor exits from the flow space.

Figure 4:
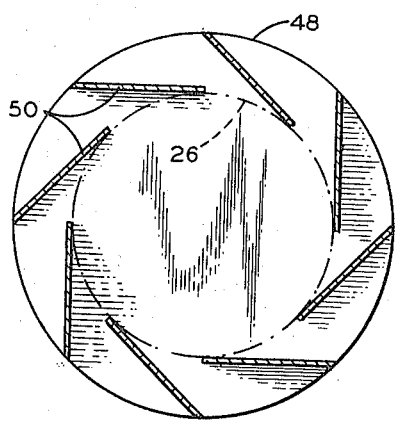
FIG. 4 is a transverse section taken along line 4—4 in FIG. 2.

The separator shown in FIGS. 5, 6, and 7 operates in the same manner as that shown in FIGS. 2, 3, and 4. However, the knife edge 147 on the inwardly projecting edge of the slots 146 may advantageously be used to skim the liquid film as it forms on the inner face of the separator can. It will be noted in FIGS. 3 and 6 that the arrows indicating the path of flow of the vapor and liquid within the can show that the inwardly projecting edge of the slot faces into the stream of the liquid film flowing upwardly along the can wall to effectively skim the liquid and direct it into the annular space formed by the can and its enclosing wall. Further, in FIG. 5 the plate assembly 149 at the lower end of the separator forms a well or liquid collecting space 151 to catch any liquid which separates out as the liquid mixture flows through inlet vanes 150.

One of the more important features of this separator, and common to both embodiments, is the vapor bypass arrangement formed by the inclined slots in the separator can wall and the annular flow space with its baffle. By means of this construction separated liquid is removed from the interior of the can and directed into the flow space with no possibility of its reentrainment with the main body of steam. Additionally, the baffle assures that the downward flow of the fluid in the flow space will permit separation of the relatively small amount of steam entrained in the fluid entering space and facilitate its entry through the vapor outlets.

While separators 22 and 122 have been described primarily as secondary separators it will be appreciated that they also may be used as the single or primary means of separation. The separator arrangement disclosed could be used to separate other types of two phase vapor liquid mixtures though it is particularly adaptable for use as a steam-water separator.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

We claim:

1. A vapor-liquid separator comprising means forming a vertically arranged separator can open at its lower end, a horizontally arranged plate spaced below and in alignment with said can, a substantially cylindrical wall laterally spaced apart from and encircling said separator can and forming with the can an annular flow space thereabout, upper and lower annular plate means respectively connecting the upper and lower ends of said wall and can, said upper plate means disposed across and attached to the upper end of said can and having a restricted centrally located opening therein, said restricted opening having a substantially smaller area than the cross-sectional area of said can and providing a separated vapor outlet from said can, whirl inducing mens including upright vanes contacting and extending between said horizontally arranged plate and said lower plate means for directing a vapor-liquid mixture into the lower end of said can and for imparting to the mixture a whirling flow path within said can, opening means in said upper annular plate means forming a restricted outlet between the upper end of the can and said wall for discharge of vapor from the upper end of said annular space, means forming a liquid outlet from the lower end portion of said annular space, an upright substantially cylindrical baffle disposed in said annular space between said can and opening means and having its upper end connected to said upper plate means, and means forming at least one narrow upwardly inclined elongated opening in the wall of said can and extending through a major portion of the height of said can whereby separated liquid is skimmed off the inside wall of the can and flows into the annular space and whereby vapor flows from said can into said annular space in a quantity regulated by the restriction of the vapor outlet from said annular space.

2. A vapor-liquid separator as set forth in claim 1 wherein a demister is positioned in the annular space between said cylindrical wall and said baffle to dry the vapor passing to the vapor outlet of the annular flow space.

3. A vapor-liquid separator comprising:

(A) a vertically arranged cylindrically shaped separator can open at both of its ends, (B) a horizontally extending annular shaped plate disposed across and attached to the upper end of said separator can with its centrally located opening providing a separated vapor outlet from the can, (C) a circular horizontally arranged plate spaced below and in alignment with lower end of said separator can, said plate having a greater diameter than that of said separator can, (D) a cylindrically shaped upright wall section concentrically disposed about and spaced from said separator can forming an annular flow space therebetween, (E) a first ring shaped plate section extending between and attached to the upper ends of said separator can and wall section forming a top closure for said annular flow space, (F) a second ring shaped plate section extending between and attached to the lower ends of said separator can and wall section forming a bottom closure for said annular flow space, (G) a number of vapor outlets located in said first plate section, (H) a separated liquid outlet located in said second plate section, (I) a plurality of vanes extending vertically between said plate and the said second plate section, (J) said vanes arranged tangentially to the wall of said separator can for imparting a whirling motion to the vapor-liquid entering the separator, (K) a plurality of narrow elongated slots in the wall of said separator can, said slots extending upwardly at an angle to the vertical axis of the can, one edge of said slot punched outwardly from the wall of the can the other edge of the slot punched inwardly from the wall of the can whereby separated liquid and a relatively small amount of separated vapor is skimmed off the inside wall of the can and flows into the annular flow space said inwardly punched slot edge having a knife edge, and (L) a vertically extending cylindrical baffle located within said annular flow space and spaced between the slots in the wall of said can and the vapor outlets from the annular space, said baffle attached to and extending a substantial distance downwardly from the first plate section dividing the upper end of said annular flow space for assuring the downward flow of separated liquid which enters the upper end of said annular flow space from within the can.

4. A vapor-liquid separator as set forth in claim 3 wherein a separated liquid outlet is located in said circular plate spaced below the lower end of said separator can.

References Cited

UNITED STATES PATENTS

| | | | |
|---|---|---|---|
| 223,403 | 1/1880 | Stewart | 55—307 |
| 229,207 | 6/1880 | Thornton | 55—456 |
| 267,470 | 11/1882 | Walker | 55—456 X |
| 308,500 | 11/1884 | Jones. | |
| 1,170,438 | 2/1916 | Fahrney | 55—337 |
| 1,512,358 | 10/1924 | Neill | 55—186 X |
| 1,539,478 | 5/1925 | Hawley. | |
| 1,539,482 | 5/1925 | Hawley. | |
| 1,851,427 | 3/1932 | Hinkle | 55—253 X |
| 1,896,894 | 2/1933 | Hawley | 55—396 |
| 2,193,883 | 3/1940 | Reeves | 55—337 |
| 2,214,658 | 9/1940 | Browning | 55—398 |
| 2,425,588 | 8/1947 | Alexander | 55—398 |
| 2,687,780 | 8/1954 | Culhane | 55—349 X |
| 2,806,551 | 9/1957 | Heinrich | 55—456 X |
| 2,862,479 | 12/1958 | Blaser et al. | 122—34 |
| 2,923,377 | 2/1960 | Schluderberg | 55—392 X |
| 2,970,671 | 2/1961 | Warner | 55—455 X |
| 3,173,771 | 3/1965 | Barrett et al. | 55—457 X |
| 3,213,833 | 10/1965 | Cunningham et al. | 122—34 |
| 3,251,176 | 5/1966 | Gleason | 55—457 X |

FOREIGN PATENTS

| | | |
|---|---|---|
| 112,138 | 1/1941 | Australia. |
| 544,263 | 6/1943 | Great Britain. |
| 637,962 | 5/1950 | Great Britain. |

HARRY B. THORNTON, *Primary Examiner.*

ROBERT F. BURNETT, *Examiner.*

D. K. DENENBERG, D. TALBERT,
*Assistant Examiners.*